No. 749,459. PATENTED JAN. 12, 1904.
B. W. STEVENS.
WAD SORTER AND ASSEMBLER.
APPLICATION FILED APR. 3, 1903.
NO MODEL. 4 SHEETS—SHEET 1.
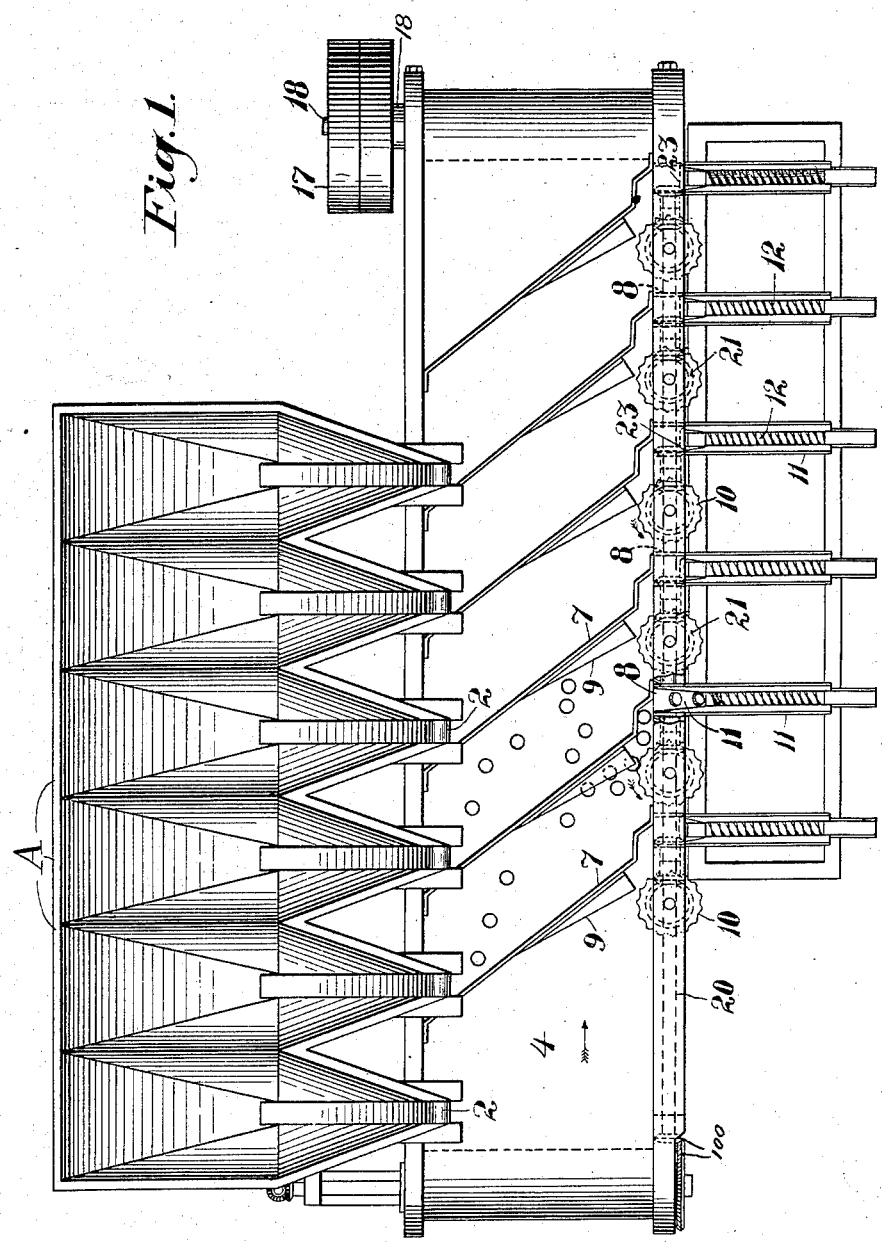
Witnesses:-
Inventor,
Brainard W. Stevens
By Geo. H. Strong
atty

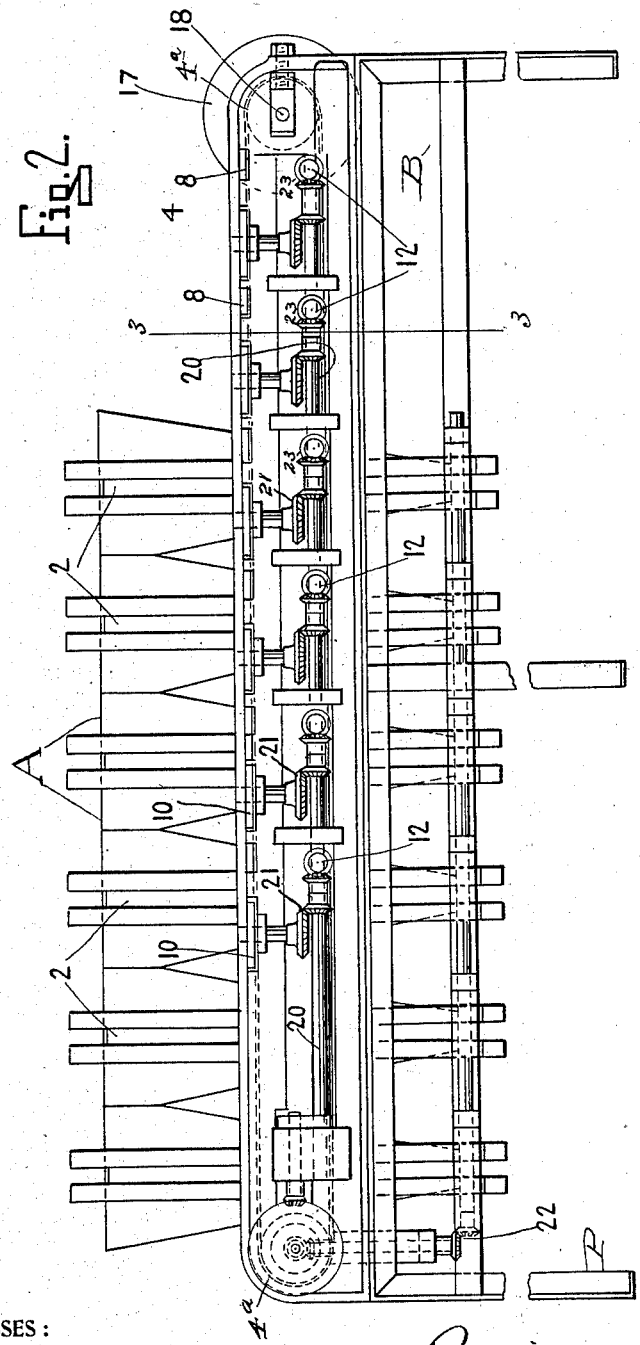

No. 749,459. PATENTED JAN. 12, 1904.
B. W. STEVENS.
WAD SORTER AND ASSEMBLER.
APPLICATION FILED APR. 3, 1903.
NO MODEL. 4 SHEETS—SHEET 3.
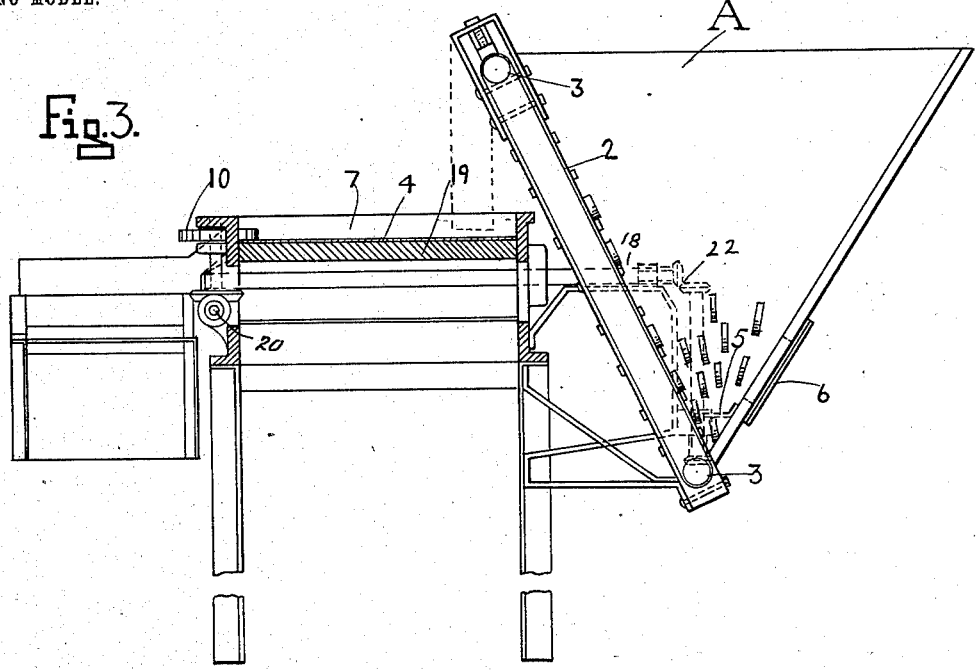
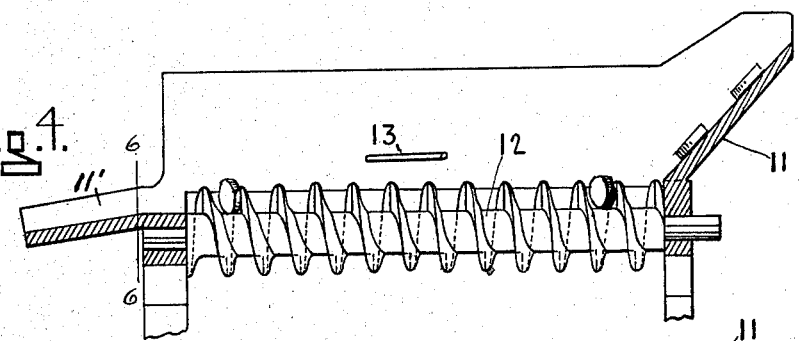
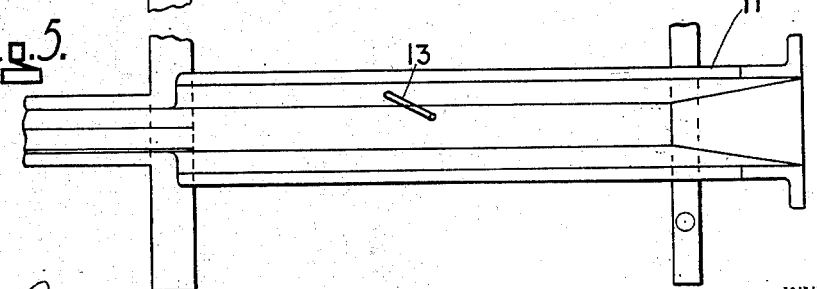
WITNESSES:
INVENTOR
Brainard W. Stevens
BY
Geo. H. Strong.
ATTORNEY No. 749,459. PATENTED JAN. 12, 1904.
B. W. STEVENS.
WAD SORTER AND ASSEMBLER.
APPLICATION FILED APR. 3, 1903.
NO MODEL. 4 SHEETS—SHEET 4.
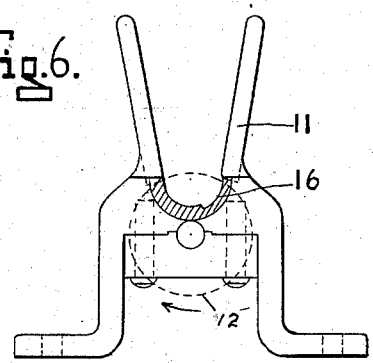
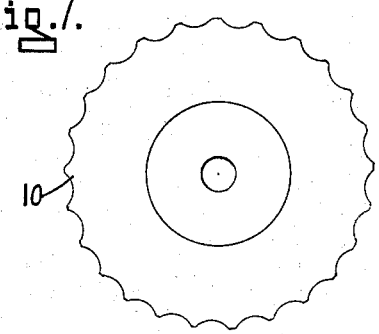
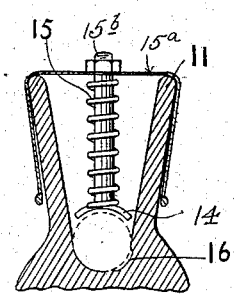
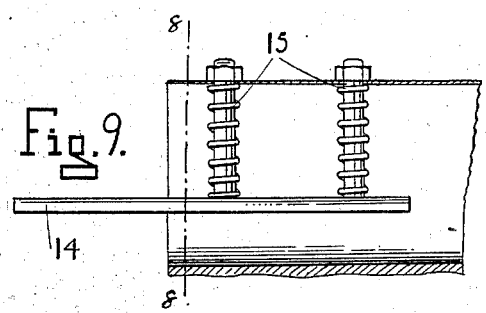
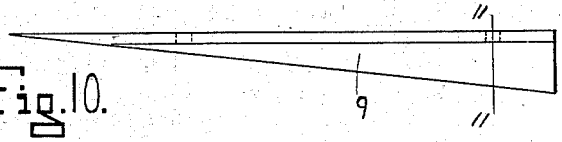
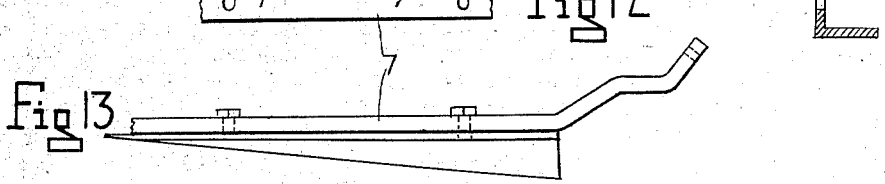
WITNESSES:
John Ohler.
J. B. Rowse
INVENTOR
Brainard W. Stevens
BY
Geo. H. Strong.
ATTORNEY No. 749,459. Patented January 12, 1904.

UNITED STATES PATENT OFFICE.

BRAINARD W. STEVENS, OF PINOLE, CALIFORNIA, ASSIGNOR TO CALIFORNIA POWDER WORKS, OF HERCULES, CALIFORNIA, A CORPORATION OF CALIFORNIA.

WAD SORTER AND ASSEMBLER.

SPECIFICATION forming part of Letters Patent No. 749,459, dated January 12, 1904.

Application filed April 3, 1903. Serial No. 150,922. (No model.)

*To all whom it may concern:*

Be it known that I, BRAINARD WYMAN STEVENS, a citizen of the United States, residing at Pinole, county of Contra Costa, State of California, have invented an Improvement in Wad Sorters and Assemblers; and I hereby declare the following to be a full, clear, and exact description of the same.

My invention relates to an apparatus the purpose of which is to separate mixed gun wads or disks of equal diameter, but of unequal thicknesses, and then to set up and assemble the wads in groups or tubes, with their flat sides remaining parallel and contiguous.

It consists of one or more hoppers into which the wads are first placed, means for conveying the wads from the hoppers upon an endless traveling belt, means for assorting the thicker from the thinner wads, means for assembling the wads in tubes from which they may be used in the cartridge-loading machines.

It also comprises details of construction which will be more fully explained by reference to the accompanying drawings, in which—

Figure 1 is a general plan view of my apparatus. Fig. 2 is a side elevation of same. Fig. 3 is a section on line 3 3, Fig. 2. Fig. 4 is a center section of screw or auger spout, showing screw in position. Fig. 5 is a plan of the auger-spout. Fig. 6 is a section on line 6 6, Fig. 4. Fig. 7 is a plan view of kicker-wheel. Fig. 8 is a section of screw-spout on the line 8 8 of Fig. 9, showing spoon attachment. Fig. 9 is a longitudinal vertical section of same, taken at a point where the bottom of the trough is open. Fig. 10 is a plan view of guide attachment. Fig. 11 is a section on line 11 11, Fig. 10. Fig. 12 is a side view of a portion of the vertical member 7 of the guide, Figs. 1, 2, 3. Fig. 13 is an edge view of said vertical member.

In the loading of ammunition the powder and shot are loaded by machinery into the cartridge-shells and are retained in place by suitable wads placed in the shells. It is desirable that these wads should be of certain thicknesses to correspond with the varying amounts of powder and shot with which the shells are charged for different purposes.

It is the purpose of this machine to automatically separate the mixed gun-wads of equal diameter, but unequal thickness, and to set up and assemble the wads into various collections, according to the thickness, in grooves or tubes, with their flat sides parallel and contiguous. Thus any number of tubes may be charged from this machine, and it is only necessary for the operators of the loading-machine to supply the loading-machine with wads from these tubes of any desired thickness and as may be required.

The apparatus is mounted upon any suitable frame or support, as at B.

A represents hoppers, of which hoppers there may be any desired number in line with each other. The apparatus is mounted upon any suitable frame or support, as at B. These hoppers have inclined sides, and the sides and rear end converge toward the bottom and what may be termed the "front" or "discharge" end of the hopper. Upon the side of each hopper is a belt 2, passing around drums 3 at the top and bottom, and the belt has the necessary ribs and protuberances and serves as a carrier by which the wads are raised to the upper end and discharged thence, falling upon a horizontal traveling belt 4. In the bottom of the hopper I have shown an elastic rubber trap or partition, which extends approximately horizontal from the rear side to the traveling belt, as shown at 5, and this prevents the wads from clogging at the apex where the belt and the side of the hopper meet. Upon the inclined back of the hopper is an opening having a slide by which it is closed, as shown at 6, and this serves for cleaning out the hopper when required.

The horizontal traveling belt 4 passes around drums $4^a$, sufficiently separated, the distance between the drums depending upon the number of hoppers and the number of grades into which the wads may be sorted. The wads passing over the top of the belt 2 are guided by suitable chutes formed by the inclosures within which the belt runs and is guided so as to fall upon the horizontal traveling belt 4, and by this belt, which moves in the direction indicated, the wads are carried forward and come in contact with adjustable guides 7, which stand at an angle to the belt 4, as indicated, and which may be adjusted with relation to the belt, as will be hereinafter described. The guides 7 are bars of metal bent as shown in Figs. 1 and 13 and having a greater vertical depth than transverse thickness, with slots made through them, as shown in Fig 12. These guides stand at such an angle that the forward movement of the belt causes the wads to gradually move along the inclined guides to the side of the cast-iron frame, where opening 8 allows the wads to fall through into screw-carrier located below. The guides 7 have each an attachment in the form of a triangular piece of wood or metal, as shown at 9, which is fixed to the guide at a point above the belt at a distance equal to a little more than the thickness of the wad. The object of this device is to allow but one wad to pass, so that if one wad be superposed upon another, when the wads come in contact with this attachment 9, the upper one will be pushed off by contact with the attachment, while the lower one will be allowed to pass beneath the attachment and be carried to the hole 8, through which it drops. The holes 8 are made in the edge of the table or frame over which the belt 4 travels and just beyond the outer edge of the belt. The attachments are vertically adjustable on the guides 7, which are slotted, as at 7', whereby said attachments may be moved relative to the belt in the same manner as with the guides. In order to prevent the wad which has not passed under this attachment from being carried along with the other, I have shown a wheel 10, which I term a "kicker-wheel." This wheel revolves backwardly—that is, against the forward travel of the belt—and has its surface suitably roughened or corrugated, as shown, and its action is to arrest and throw back temporarily the wads which do not pass under the attachment 9, and it thus prevents two wads passing simultaneously and keeps the belt clear at the discharge-point, allowing but one wad at a time. In Fig. 1 the kicker-wheels 10 are shown journaled to turn in horizontal planes and are in such position with relation to the parts 9 that while the wad which is beneath the part 9 is following the guide 7 to the opening 8 any wads which may have been crowded back and not yet able to obtain a position against the guide 7 will strike the corrugated edge of the wheel 10 and will be kicked or thrown back upon the belt. The wads are continually brought forward again by the movement of the belt and will eventually find a place between others and against the guide. The wads when discharged fall through the opening or openings 8 into the screw conveyer, which consists of a trough or hopper 11, in which the horizontally-journaled screw 12 revolves, and the wads falling between the threads of this screw are carried forward to the discharge end 11'. The screws are made with the forward or driving sides of the threads arranged so that the wads will be retained vertically on edge and advanced in this position to the discharge-point, traveling out into the groove at the delivery end of the screw and remaining in a vertical position, with the flat sides touching. The front faces of the screw-threads are planes vertical to the axis or shaft when viewed in section; but these faces are also spirally disposed, as shown in Fig. 4. If any of the wads should so fall as to ride upon the top of the screw-threads they are turned and dropped properly between the screw-threads by means of a wire 13, which extends diagonally through the side of the screw trough or hopper and in such a manner that the end of the wire will contact with the wad which is not properly placed, so as to turn the said wad and cause it to drop into the screw-thread to be properly advanced, as before described.

For assembling wads without assorting them the guides may all be set down close to the belt 4, and the wads of each hopper are thus deposited upon the belt, as previously described, and carried by it to the respective discharge-openings 8, from which they fall into the traveling screws and are discharged through the discharge chute or opening at the end, being received into the receiving-grooves or tubes, and are thus assembled without regard to the varying thickness of the wads. When the wads are to be assorted, the guides are raised above the belts to such a point that only the thickest wads will be directed to the first screw and carried by it to the discharge. At the second guide the next thickest size goes to its screw, and so on until the last guide catches the thinnest of the wads. For assembling, the wads are fed in, each size having its own hopper, into which the wads are placed after assorting. For sorting, all the wads are fed by the first hopper and are assorted by the guides, as above described.

In order to prevent the wads from jumping out of position before entering the groove at the discharge, I have shown an inverted spoon 14, having springs 15, by which it is held down upon the tops of the wads, and they are thus kept in line until discharged. A cover $15^a$ receives the ends of the bolts $15^b$, to which each spoon is fixed, as shown in Fig. 8.

The delivery end of the screw-hopper has a groove or enlarged passage formed in it, as shown at 16. This groove is herein shown in the right-hand side of the opening looking from the delivery end, because the motion of the screw continually forces the wads against the right side of the hopper. The object of this groove is to permit the passage of a wad which has had a small piece cut out of one side, but not enough to render the wad worthless. The sides of the screw hopper or trough are so designed as to meet the threads of the screw with only a working clearance, and they extend down to approximately three thirty-seconds of an inch below the tops of the threads. The screw trough or hopper is open below this point, and any half-wads or broken pieces will thus fall through, and only the perfect or nearly perfect wads will pass into the groove.

Any suitable or desired train or gearing or equivalent mechanism may be employed for driving the apparatus. As shown in the present case, fast and loose pulleys, as at 17, Fig. 1, are mounted upon a transverse shaft 18, and this shaft carries the driving-drum of the traveling belt 4, the other drum being located generally at the opposite end of the machine. The belt 4 is here shown as with the upper portion traveling over a rigid wooden or other surface, as at 19, Fig. 3, which retains the surface of the belt in continuous plane and prevents sagging at any point. A longitudinal driving-shaft 20, Fig. 2, has beveled pinions fixed upon it, and these engage beveled gears, as at 21, mounted upon the shafts of the kicker-wheels 10, and by this mechanism these wheels are caused to revolve. The longitudinal shaft is driven by bevel-gears 100, Fig. 1, upon one or the other of the belt-drum shafts, as shown. The hopper-belts are driven by gearing also actuated from the main driving-shaft, as shown at 22. The shafts of the screws 12, extending outwardly at right angles from the travel of the belt 4, are driven by bevel-gears from the main longitudinal shaft, as at 23; but it will be manifest that various modifications and changes in the driving-gear may be made without materially altering the character of the invention.

Having thus described my invention, what I claim, and desire to secure by Letters Patent, is—

1. An apparatus for assorting mixed gun-wads of equal diameter and unequal thickness, consisting of an endless traveling substantially horizontal belt, means for delivering the wads upon said belt, guides extending diagonally above the surface of the belt and at successively decreasing distances therefrom whereby the wads are arrested in the order of their decreasing thickness and delivered by said guides to the side of the belt, screws revoluble at right angles with the belt into which the wads are received, and by which they are conveyed outwardly and receiving grooves or tubes into which they are delivered.

2. An apparatus for assembling wads in grooves or tubes consisting of a hopper or receiver, means for delivering the wads successively from said hopper or receiver a substantially horizontal traveling belt upon which the wads are delivered, a diagonally-disposed guide extending across the upper surface of the belt and in close proximity therewith whereby the wads are caused to travel to the edge of the belt, chutes through which the wads are caused to fall, a flanged screw between the threads of which the wads are received, means for revolving said screw whereby the wads are caused to travel outwardly between the threads and grooves or tubes into which the wads are delivered with their flat sides parallel and contiguous.

3. An apparatus for assembling wads of equal diameter into grooves or tubes consisting of a hopper having convergent sides, an endless traveling carrying-belt movable in the plane of one of said sides adapted to raise the wads from the hopper and deliver them from the upper end, a substantially horizontal traveling belt upon which the wads are delivered, a guide extending diagonally across the belt in close proximity thereto whereby the wads are caused to move to the side of the belt, openings through which the wads are delivered and a traveling screw between the threads of which the wads are received and the discharge through which they are delivered to a receiver.

4. An apparatus for sorting and assembling gun-wads consisting of a hopper having convergent sides, an endless traveling belt movable parallel with one of said sides, said belt serving as a carrier to lift the wads and continuously deliver them over its upper end, a substantially horizontal traveling belt upon which the wads are received, diagonally-disposed fixed guides extending across above the belt whereby the wads are caused to move to the discharge edge of said belt, and an attachment fixed to the guide at an elevation above the surface of the belt equal to the thickness of a single wad whereby any superposed wads will be forced off the lower one and prevented from choking the discharge.

5. An apparatus for assorting gun-wads of equal diameter consisting of a convergent wad-containing hopper, a carrier adapted to raise the wads successively from the hopper, a substantially horizontal traveling belt upon which the wads are delivered, diagonally-disposed fixed guides extending across at different distances above the belt and acting to move the wads to the discharge edge of the belt, a triangular attachment fixed to the guide sufficiently above the belt to allow a single wad to pass beneath it and against the guide and acting to displace any superposed wad, and a backwardly-revolving wheel whereby said displaced wad is retarded and prevented from clogging the discharge-opening.

6. A device for assorting mixed gun-wads of equal diameter but unequal thickness consisting of a wad-containing hopper having convergent sides and an elevator by which the wads are successively removed from said hopper, a substantially horizontal traveling belt upon which the wads are delivered from the elevator, a series of guides extending diagonally across the belt, each guide successively nearer to the belt and adapted to arrest wads of successively decreasing thickness, attachments to the guides whereby superposed wads are dislodged from those upon which they rest, backwardly-rotating wheels by which said dislodged wads are prevented from clogging those which are to be discharged, flanged screws having essentially vertical driving-faces to their threads against which the wads stand flatwise, said screws being revoluble and adapted to transfer the wads outwardly from the carrying-belt and deliver them into grooves or tubes in the order of their thickness.

7. An apparatus for the assorting and assembling of mixed gun-wads of equal diameter consisting of a wad-containing hopper, an elevator by which the wads are delivered successively therefrom, a substantially horizontal traveling belt upon which the wads are received, means for transmitting the wads to the outer edge of the belt, screws having threads, the front faces of which are in lines radial to the axes of the screws, between which the wads are delivered upon edge and by which they are transmitted outwardly to the discharge, and a curved spring-pressed concavo-convex spoon extending above the threads of the screw whereby the wads are prevented from being thrown outward before entering the discharge-groove.

8. In an apparatus for assorting gun-wads of equal diameter, the combination with a supply-hopper, means for delivering the wads therefrom, a traveling belt upon which the wads are received, troughs communicating with the belt and each having a horizontally-revoluble screw extending axially therethrough whereby the wads are advanced to the discharge end of the trough, and a wire or stop projecting diagonally through the side of the trough above the threads of the screw adapted to contact with and turn wads which have been delivered so as to ride upon the top of the screw-thread.

9. In an apparatus for assembling gun-wads of equal diameter, a substantially horizontal endless traveling belt, means for delivering the wads thereon, diagonally-disposed guides located above the belt whereby the wads are transferred to the side of the belt, troughs or hoppers at substantially right angles with the belt and below the surface thereof, longitudinal screws revoluble in said troughs and each having their front faces radial to the axis of the screw between which threads the wads are designed to fall upon edge, and a wire or stop extending diagonally through the side of the trough above the screw-threads, and adapted to contact with and turn wads which may ride upon the tops of the screw-threads so as to cause them to fall in proper position between said threads.

10. In an apparatus for assembling gun-wads of equal diameter in grooves or tubes, an endless substantially horizontal traveling belt, means for delivering the wads successively upon said belt, means for delivering the wads successively from the discharge edge of the belt, troughs or hoppers extending outwardly from the belt having screws revoluble therein with threads between which the gun-wads are received, and by which they are moved outwardly, standing upon edge, a discharge at the end of the screw thread or hopper, said discharge having a groove formed therein whereby defective wads are prevented from clogging the screws.

11. In an apparatus for the assembling of gun-wads of equal diameter, a traveling screw having threads whose front faces are radial to the axis of the screw, means for delivering the wads upon edge between the threads upon the top of the screw, a trough or hopper inclosing the screw and meeting the threads with a working clearance between the two said trough or hopper being open at the bottom, whereby broken pieces of wads are discharged through said opening, a groove or tube continuous with the discharge end of the screw-hopper into which the wads are assembled, and a groove formed in the delivery end of the screw-hopper whereby partially-defective wads are prevented from clogging the screw.

In witness whereof I have hereunto set my hand.

B. W. STEVENS.

Witnesses:
W. J. PFEIFFER,
L. E. HART.